United States Patent
Paya et al.

(10) Patent No.: US 7,240,192 B1
(45) Date of Patent: Jul. 3, 2007

(54) COMBINING A BROWSER CACHE AND COOKIES TO IMPROVE THE SECURITY OF TOKEN-BASED AUTHENTICATION PROTOCOLS

(75) Inventors: Ismail Cem Paya, Seattle, WA (US); Trevin Chow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 856 days.

(21) Appl. No.: 10/388,072

(22) Filed: Mar. 12, 2003

(51) Int. Cl.
   *H04L 29/00* (2006.01)
(52) U.S. Cl. .................................. 713/152; 726/28
(58) Field of Classification Search ........... 726/28; 713/152
   See application file for complete search history.

(56) References Cited

U.S. PATENT DOCUMENTS

| | | | |
|---|---|---|---|
| 5,907,621 A | 5/1999 | Bachman et al. | |
| 5,961,601 A | 10/1999 | Iyengar | |
| 6,330,566 B1 | 12/2001 | Durham | |
| 6,385,642 B1 | 5/2002 | Chlan et al. | |
| 6,836,845 B1* | 12/2004 | Lennie et al. | 713/181 |
| 2001/0047477 A1* | 11/2001 | Chiang | 713/170 |
| 2002/0078177 A1 | 6/2002 | Dutta | |
| 2002/0116531 A1 | 8/2002 | Chu | |
| 2002/0143933 A1 | 10/2002 | Hind et al. | |
| 2003/0005134 A1 | 1/2003 | Martin et al. | |
| 2004/0010603 A1* | 1/2004 | Foster et al. | 709/229 |

FOREIGN PATENT DOCUMENTS

GB 2346229 8/2000

OTHER PUBLICATIONS

Berghel, "Hijacking the Web," Communications of the ACM, Apr. 2002, pp. 23-27, vol. 45, Issue 4, ACM Press, New York, U.S.A.
Reagle et al., "The Platform for Privacy Preferences," Communications of the ACM, Feb. 1999, pp. 48-55, vol. 42, Issue 2, ACM Press, New York, U.S.A.

(Continued)

*Primary Examiner*—Kambiz Zand
*Assistant Examiner*—Andrew L Nalven
(74) *Attorney, Agent, or Firm*—Senniger Powers

(57) ABSTRACT

Combining a browser cache and cookies to improve the security of token-based authentication protocols. A client stores a first portion of an authentication token as information (e.g., a cookie) in a first memory area. The client stores a second portion of the authentication token as server-inaccessible information (e.g., cached web content) in a second memory area. A server obtains the first and second portions from the client to recreate the authentication token to authenticate the client.

37 Claims, 9 Drawing Sheets

OTHER PUBLICATIONS

Anton et al., "Web Caching for Database Applications with Oracle Web Cache," Proceedings of the 2002 ACM International Conference on Management of Data and Symposium on Principles of Database Systems, 2002, pp. 594-599, ACM Press, New York, U.S.A.

Felten et al., "Timing Attacks on Web Privacy," Proceedings of the ACM Conference on Computer and Communications Security, 2000, pp. 25-32, ACM Press, U.S.A.

Kristol, "HTTP State Management Mechanism," Network Working Group, Request for Comnments: 2965, The Internet Society, Oct. 2000, pp. 1-22, U.S.A.

Berghel, "Digital Village: Caustic Cookies," Communications of the ACM, May 2001, pp. 19-22, vol. 44, Issue 5, ACM Press, New York, U.S.A.

Treese, "Putting it Together: Data Collection and Consumer Privacy," netWorker, Dec. 2000, pp. 9-11, vol. 4, Issue 4, ACM Press, New York, U.S.A.

Berghel, "Responsible Web Caching," Communications of the ACM, Sep. 2002, pp. 15-20, vol. 45, Issue 9, ACM Press, New York, U.S.A.

Smith, "FAQ: Web Bugs," Resources, http://www.privacyfoundation.org/resources/webbug.asp, accessed Mar. 18, 2003, 8 pages, Privacy Foundation, U.S.A.

"Meantime: Non-Consensual HTTP User Tracking Using Caches," printed from http://sourcefrog.net/projects/meantime/, Jan. 9, 2001, 5 pages.

* cited by examiner

COMBINING A BROWSER CACHE AND COOKIES TO IMPROVE THE SECURITY OF TOKEN-BASED AUTHENTICATION PROTOCOLS

TECHNICAL FIELD

The present invention relates to the field of authentication. In particular, this invention relates to improving the security of protocols constructed around authentication tokens.

BACKGROUND OF THE INVENTION

Web sites such as Internet sites often provide information, products, services, and the like to their users. Many web sites require users to register before their web servers will grant access to the users. During registration, a user typically supplies personal information such as a username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

If the user visits several different web sites, each web site may require entry of similar registration information about the user, such as the user's name, mailing address, and e-mail address. This repeated entry of identical data is tedious when visiting multiple web sites in a short period of time. Many web sites require the user to register before accessing any information provided on the site. Thus, the user must first enter the requested registration information before he or she can determine whether the site contains any information of interest.

After registering with multiple web sites, the user must remember the specific login ID and password used with each web site or other network service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs such as: smith, smith1, bsmith, smithb, bobsmith, bob_smith, and smithbob.

Further, different passwords may be associated with different login IDs due to differing password requirements of the different web sites (e.g., password length requirements or a requirement that each password include at least one numeric character and/or at least one uppercase character). Thus, Bob Smith must maintain a list of web sites, login IDs, and associated passwords for all sites that he visits regularly.

Although presently available multi-site user authentication systems or login services permit a web user to maintain a single login ID (and associated password) for accessing multiple, affiliated or relying web servers or services, further improvements are desired. For example, transactional communications between a client computer and a server computer are at risk of tampering by a third party. When a user on a client computer communicates with server such as a web site via, for example, a hypertext transfer protocol (HTTP), there is often a need to share authentication information between the client and the server. One common way to share authentication information (e.g., a token) is by storing authentication information as a block of data on the client computer. Such a block of data, commonly known as a cookie, is generated by a server and sent to the client. Cookies were standardized as Internet Engineering Task Force (IETF) Request for Comments (RFC) 2965. Presently, cookies are widely supported by web browsers and allow a server to store arbitrary state information on the client.

The client computer presents the cookie with authentication information to the server during subsequent visits to web pages served by the server. However, cookies are unreliable because the cookie carrying the authentication token may be captured and used in a replay attack. That is, a captured cookie (e.g., a cookie with a captured uniform resource locator) may be resubmitted to the server by an attacker masquerading as the user to gain improper access to another user's information for the life of the authentication token. In general, carrying the authentication token in a cookie has historically proven vulnerable to multiple exploits leading to compromise of the information stored in the cookie (e.g., critical authentication credentials). Bugs in cookie handling code as well as their availability to active content such as JAVASCRIPT have created serious vulnerabilities.

For these reasons, a system for improving the security of protocols constructed around authentication tokens is desired to address one or more of these and other disadvantages.

SUMMARY OF THE INVENTION

The invention includes software to improve the security of protocols constructed around issuing and replaying authentication tokens. A server provides a client with a first portion of an authentication token adapted for storage in a memory area associated with the client (e.g., a cookie). The server also provides to the client a second portion of the authentication token adapted for storage by the client as server-inaccessible information. For example, the client may store the first portion of the authentication token as a cookie and store the second portion of the authentication token in a web page in a browser cache. The first and second portions of the authentication token are stored, transported, or operated on by different components and hence subject to different security risks. As such, compromise of both memory areas is necessary to reconstruct the token. The data in the memory areas are associated by a predetermined relationship that the server recreates to reconstruct the token to authenticate the client. The overall security of the authentication token is enhanced because the token is stored as information in memory areas subject to different security risks.

In one embodiment, the invention software prevents the replay of cookies carrying authentication tokens by employing a cached web page. The client sends a client identifier stored in a cookie and a credential value to the server when the client renders the cached web page. The client identifier is uniquely associated with the client computer. The server reconstructs an authentication token by computing another credential value based on the received client identifier. The server validates that the authentication cookie received from the client was originally issued to the client computer by comparing the computed credential value with the credential value received from the client. If the authentication cookie was originally issued to another client computer (e.g., stolen), authentication will fail because the computed credential value and the received credential value will not match.

In accordance with one aspect of the invention, a method improves the security of protocols for communication between a client and a server coupled to a data communication network. The method includes receiving, at the server, a request from the client for a resource. The method also includes providing a first portion of the authentication token to the client in response to the received request. The first portion of the authentication token is adapted for storage in a first memory area associated with the client. The method also includes providing a second portion of the authentication token to the client in response to the received request. The second portion of the authentication token is adapted for storage as information in a second memory area associated with the client. The information is inaccessible to the server.

In accordance with another aspect of the invention, a method improves the security of protocols for communication between a client and a server coupled to a data communication network. The method includes receiving, at the server, a request from the client for a resource. The method also includes obtaining, in response to the received request, a first portion of an authentication token from the client. The authentication token has the first portion stored by the client in a first memory area and a second portion stored by the client as information in a second memory area. The information is inaccessible to the server. The method also includes obtaining, in response to the received request, the second portion of the authentication token from the client. The method also includes combining the obtained first and second portions to recreate the authentication token.

In accordance with yet another aspect of the invention, one or more computer-readable media have computer-executable components for improving the security of protocols for communication between a client and a server coupled to a data communication network. The components include an interface module for receiving, at the server, a request from the client for a resource. The components also include an authentication module for providing a first portion of the authentication token to the client in response to the request received by the interface module. The first portion of the authentication token is adapted for storage in a first memory area associated with the client. The authentication module further provides a second portion of the authentication token to the client in response to the request received by the interface module. The second portion of the authentication token is adapted for storage as information in a second memory area associated with the client. The information is inaccessible to the server.

In accordance with still another aspect of the invention, a computer-readable medium that has stored thereon a data structure for improving the security of protocols for communication between a client and a server coupled to a data communication network. The data structure is created by the server for delivery to the client. The data structure includes a first field representing a first portion of an authentication token adapted for storage by the client in a first memory area. The data structure also includes a second field representing a second portion of the authentication token adapted for storage by the client as information in a second memory area. The information is inaccessible to the server. The first field and the second field are combined by the server to recreate the authentication token during authentication of the client.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

An authenticator includes an opaque token used in protocols for identifying one of the parties in a multi-party communication session such as a client-server communication. One of the parties (e.g., the server) issues the token, and the other party (e.g., the client) replays the token whenever proof of identity is needed. The security of protocols (e.g., web-based) that depend on replaying authenticators may be improved by storing a portion of the authenticator in a memory area or other storage area having improved security features. According to one embodiment, the invention includes an authenticator such as an authentication token or ticket having at least two portions. The server provides a first portion of the authentication token to the client for storage in a first memory area associated with the client (see FIG. 1). The server provides a second portion of the authentication token to the client for storage in a second memory area associated with the client. Information in the second memory area is inaccessible to the server. In response to a request from the client for authentication, the server receives the first and second portions from the client and combines them to recreate the authentication token. The first and second portions of the authentication token are stored, transported, or operated on by different components and hence subject to different security risks.

For example, the first portion may include a client identifier stored as a cookie and the second portion may include a credential value stored as a web page in a client browser cache. The credential value is based on the client identifier. This implies that both the cached web page and the cookie have to be compromised before an attacker can reconstruct the authentication token. The server reconstructs the authentication token using data from the cached document and data from the cookie to authenticate the client.

In one embodiment, the client and the server are coupled to a data communication network and communicate via a stateless protocol such as hypertext transfer protocol (HTTP) having request-response semantics. Those skilled in the art will note that the invention is operable via other networks and protocols in addition to those discussed herein.

While discussed specifically with reference to the first portion as the client identifier and the second portion as the credential value, it is contemplated by the inventors that the invention software is operable with any division of the authentication token into a plurality of portions or addition of a value to the authentication token.

Exemplary Network Environment

Figure 1:
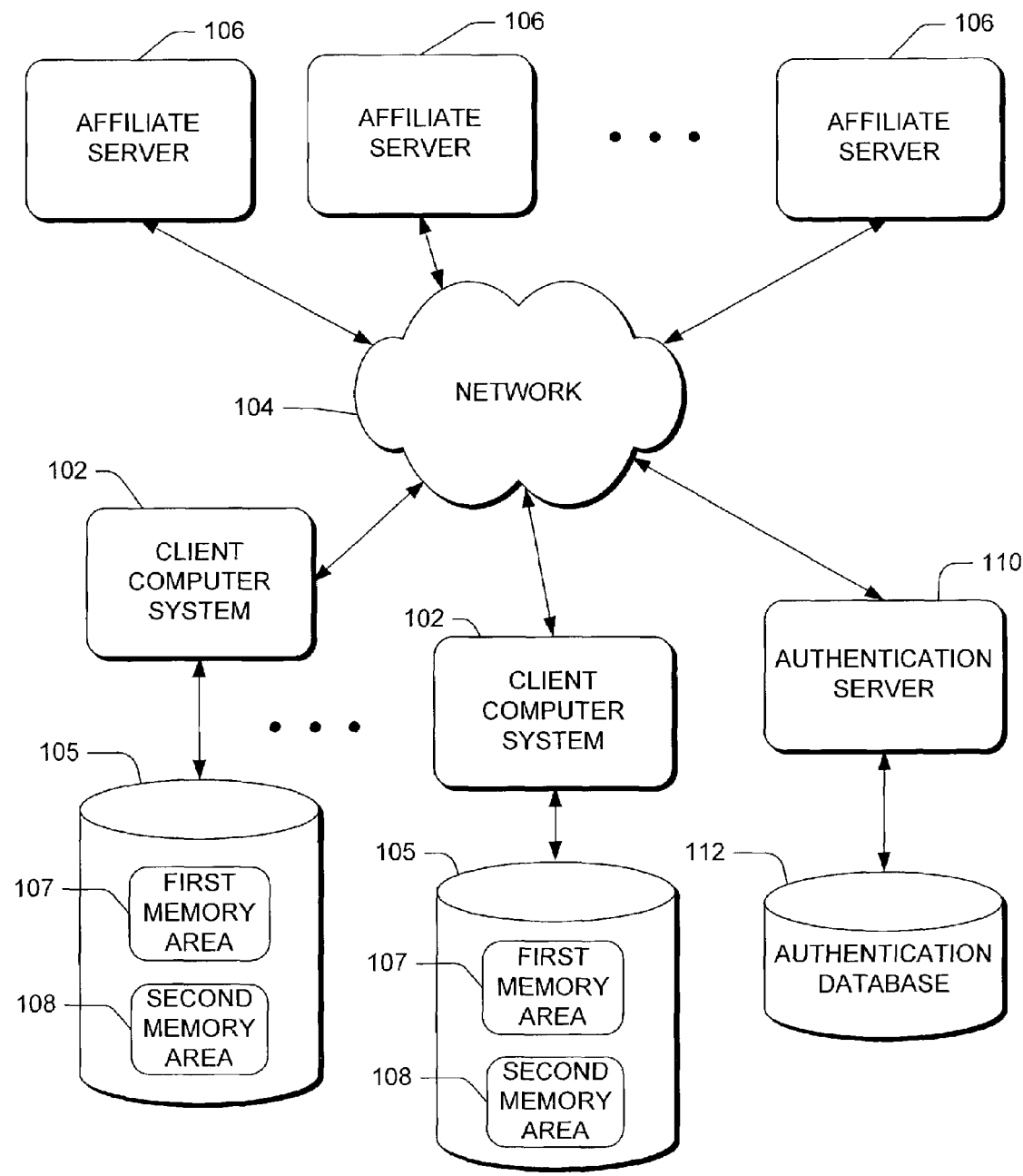
FIG. 1 is a block diagram illustrating one example of a suitable network environment in which the invention may be implemented.

Referring now to the drawings, FIG. 1 illustrates an exemplary network environment in which the present invention is utilized. The invention relates to cross-network collaboration between web sites as part of a distributed, multi-site user authentication system. Such services provide a user with the ability to access one or more participating web sites or resources with a single sign-in. Although the participating, or affiliate, sites still maintain control over permissions, they use the authentication service rather than hosting and maintaining their own proprietary authentication systems. Those skilled in the art will note that although the invention is described in terms of a multi-site user authentication system, it is contemplated by the inventors that the invention is operable with any type and number of authentication systems. According to one embodiment, the invention improves the security of protocols constructed around issuing and replaying at least one authentication token, authentication ticket, or any other data item storing authentication data.

In FIG. 1, one or more client computer systems 102 are coupled to a data communication network 104. In this example, the network 104 is the Internet (e.g., supporting the World Wide Web). However, the teachings of the present invention can be applied to any data communication network. Each of the client computer systems 102 has a storage area 105 such as a database available for storing data in, for example, a first memory area 107 and a second memory area 108. For example, the first memory area 107 may store information that is accessible to an authentication server 110 and the second memory area 108 may store information that is inaccessible to authentication server 110. Multiple affiliate servers 106 are also coupled to network 104. In turn, the client computer systems 102 can access the affiliate servers 106 via network 104. Affiliate servers 106 are also referred to as web servers or network servers.

The authentication server 110 coupled to network 104 allows communication between itself and client computer systems 102 and web servers 106. Although referred to as an authentication server, authentication server 110 in the illustrated embodiment is also a web server capable of interacting with web browsers and other web servers. In this example, authentication server 110, client computer systems 102, and web servers 106 communicate data among themselves using the hypertext transfer protocol (HTTP), a protocol commonly used on the Internet to exchange information. An authentication database 112 is coupled to authentication server 110. The authentication database 112 contains information (e.g., credentials) necessary to authenticate a user of one of the client computer systems 102 (as well as other users on the network) and also identifies which elements of the user profile information should be provided to a particular affiliate server 106 when the user accesses the affiliate server. In general, a credential includes a means for generating an authenticated reference to a single account identifier. For example, an EASI sign-in name and password, a mobile phone number and a personal identification number (PIN), and a biometric signature are all credentials that can be associated with the same profile data.

Although authentication database 112 is shown separately from authentication server 110, it is to be understood that in other embodiments of the invention, authentication database 112 may be contained within authentication server 110. In a federated environment, for example, a plurality of authentication servers 110 may be used to provide authentication.

The authentication server 110, as described herein, authenticates a user of client computer 102 seeking access to a particular one of the affiliate servers 106. Authentication server 110 first requests authenticating login information from the user, such as the user's login ID and password. If the user is successfully authenticated, authentication server 10 routes the user's client computer 102 to the appropriate affiliate server 106 for performing a desired service for the user.

As part of the user authentication process, authentication server 110 may provide certain user profile information to affiliate server 106, such as the user's e-mail address, user preferences, and the type of Internet browser installed on client computer 102. This user profile information is associated with the user's login ID so that each time the user logs into a particular affiliate server 106, the associated user profile information is available to the affiliate server. This user profile allows the user to enter the information once and use that same information during subsequent logins to new affiliate servers. By maintaining user profile information, the authentication system of the invention is able to share pertinent information with the affiliate sites to speed registration and enable access to personalized accounts or services.

In one embodiment, an affiliate server registers or otherwise establishes a relationship or affiliation with authentication server 110. Each affiliate server 106 includes a code sequence (not shown) that allows the affiliate server to communicate with authentication server 110 when a user (who is also registered with authentication server 110) requests access to affiliate server 106.

Prior to executing the authentication process, both the user of client computer system 102 and the operator(s) of affiliate servers 106 register with authentication server 110. This registration is a one-time process that provides necessary information to the authentication server. The user of client computer system 102 registers with authentication server 110 by providing information about the user and/or client computer system 102, such as, the user's name, mailing address, and e-mail address. As part of the user registration process, the user is assigned (or selects) a login ID, which is a common login ID, used to access any affiliate server (e.g., server 106). The login ID may also be referred to herein as a username, member name, or login name. As described above, multi-site user authentication systems of the type described herein permit the user to establish a unique account identified by an e-mail address. An EASI (E-mail As Sign-In) account allows the user to use an existing e-mail address as a login ID, or sign-in name (e.g., Jane@e.net) while supplying all the other attributes used to create an account.

Additionally, the user selects a password associated with the login ID that is used for authentication purposes. After registering and logging into authentication server 110, the user can visit any affiliate server 106 (i.e., affiliate servers that are also registered with the same authentication server) without requiring any additional authentication and without re-entering user information that is already contained in the associated user profile. The present invention sets forth identifying the user account, or profile, by a unique account identifier.

The operator(s) of affiliate servers 106 register with authentication server 110 by providing information about the affiliate server (e.g., server name and network address). Additionally, each affiliate server 106 provides information regarding its authentication requirements. The requirements for authentication may be specified in terms of a maximum time allowed since the last login and entry of authentication information by the user. These requirements may also be specified by the maximum time allowed since the last "refresh" of the authentication information by the user. After registering with authentication server 110, affiliate servers 106 can use the authentication server to authenticate any user that has also registered with the authentication server.

Exemplary Authentication Flow

An exemplary conversation in existing multi-site user authentication systems follows. The client 102 issues an HTTP GET request for a protected resource such as a web page (e.g., http://www.pageA.net/default.aspx). If the request includes a valid authentication ticket, the server site authenticates the client 102. If the request does not include a valid authentication ticket, the server returns status code 302 and redirects the client 102 to a sign on service. The response includes a URL in the query string that is sent to the sign on service to direct the client 102 back to the original site. The client 102 follows the redirect and issues an HTTP GET request to the sign on service server and transmits the query string information from the original site. The sign on service server presents the client 102 with a logon form. The client 102 fills out the form and does a POST back to the sign on server, using secure sockets layer (SSL). The sign on server authenticates the user and redirects back to the original URL (http://www.pageA.net/default.aspx). The response contains an encrypted authentication cookie in the query string. The client 102 follows the redirect and requests the original protected resource again, this time with the authentication cookie. Back on the originating server, the server detects the presence of the authentication ticket and tests for authentication. If successful, the request is then authenticated. Subsequent requests for protected resources at the server site are authenticated at the originating server using the supplied authentication ticket.

Present systems implement the communication flow described above by storing the authentication ticket in one or more cookies, which are stored exclusively in the same memory area by the client 102. For example, the authentication ticket may be stored in two cookies as illustrated in Table 1 below.

TABLE 1

Exemplary Cookies Storing the Authentication Credentials.

| Cookie Name | Description and Contents |
| --- | --- |
| AuthCookie | Encrypted, and contains timestamps (last refresh and last manual sign-in), saved-password flag, key version verification, and any flags set by network servers. |
| SecCookie | Sent using HTTPS protocol for all browsers that allow HTTPS cookie writes. Contains an SSL-encoded unique identifier and password for the client 102, used for silent sign-in. |

The server may send HTTP commands such as the following to set the AuthCookie and SecCookie cookies.

Set-Cookie: SecCookie=2rpJxJnOVC*PrG3UVp0vgfOi VGo5RruxsIIiG6HdwBUhFg8Y1EvBsV5OemmgPf7 OIM;
  domain=.com.test.com;path=/;secure=
Set-Cookie: AuthCookie=2rpJxJnOVDvYkdeORrd9yWj CVGo5RruxsITU jr*uBsK18aP!SnS!7njpEllch3hNcU A3SnYAGOH1DrzJOXDyyyew$$;
  domain=.com.test.com;path=/

In contrast with existing systems as described above, the invention splits the authentication ticket into at least two portions and has the client 102 store at least one of the portions in a memory area as information that is inaccessible directly to the server to improve the security of the authentication ticket. The server recreates the authentication ticket by receiving the portions from the client 102 and combining the portions according to a predefined relationship to authenticate the user (e.g., via client 102). Those skilled in the art will note that the portion of the authentication token stored as server-inaccessible information may be any data used by the server in combination with the other portion to verify that the portions were provisioned to the client 102. For example, the authentication token of existing systems may be provisioned into the two portions (or more) of the present invention. Alternatively, as described herein, one portion of the authentication token of the present invention may comprise the entire authentication token of an existing system and the additional portion(s) may include additional data not contained in the authentication token of the existing system (see equation (4) below). The process for provisioning the authentication token is next described.

Initial Authentication

Figure 2:
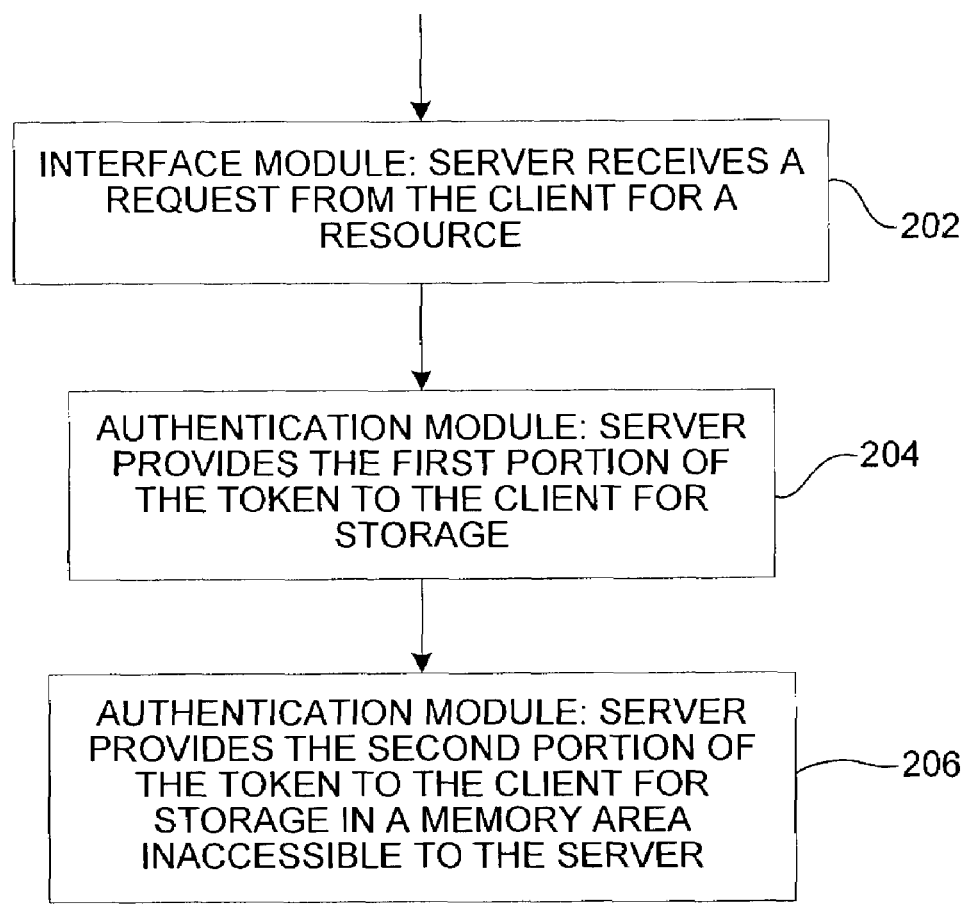
FIG. 2 is an exemplary flow chart illustrating provisioning of the authentication token by the server.

Referring next to FIG. 2, a flow chart illustrates provisioning of the authentication token by a server such as authentication server 110 (e.g., via affiliate server 106). One or more computer readable media of the server have computer-executable instructions, components, or modules for performing the method illustrated in FIG. 2. For example, the computer-readable media may store an interface module and an authentication module. The interface module of the server receives a request from the client 102 for a resource at 202. In response to the request received by the interface module, the server provides the first portion of the authentication token to the client 102 at 204. The first portion of the authentication token is adapted for storage in the first memory area 107 associated with the client 102. In one embodiment, the first portion of the authentication token includes a client identifier. For example, the server receives client identity information from the client 102 such as a login, a password, a key value, or a uniform resource locator (URL). The server generates the client identifier based on the received client identity information. The generated client identifier contains at least a part of the received client identity information. The server delivers the generated client identifier to the client 102 for storage in the first memory area 107 as the first portion of the authentication token.

The server also provides the second portion of the authentication token to the client 102 at 206. The second portion of the authentication token is adapted for storage in the second memory area 108 associated with the client 102. The second memory area 108 stores information that is inaccessible to the server. In one embodiment, the second portion of the authentication ticket includes a credential value. For example, the server computes the credential value as a function of at least a part of the client identity information and a key value. The server adds the computed credential value to web content and delivers the web content with the computed credential value to the client 102 for storage in the second memory area 108 as the second portion of the authentication token. Prior to delivering the first portion and the second portion of the authentication token to the client 102, the server stores the first portion in a data structure having a first field and a second field representing the first portion and the second portion, respectively, of the authentication token.

In the web content, the computed credential value may be added to a reference to additional content hosted by or otherwise accessible to the server. For example, the computed credential may be a query string parameter in a uniform resource locator (URL) reference in the web content. To authenticate the user (e.g., via client 102) after provisioning the authentication token, the server redirects the client 102 to the additional content via the reference. The server receives the client identifier and the credential value from the client 102. The server computes another credential value as a function of the received client identifier and the key value. The server authenticates the client 102 if the computed credential value matches the credential value received from the client 102. If the computed credential value differs from the credential value received from the client 102, the server delivers an error message to the client 102.

For example, a token-splitting mechanism according to the invention may be described by three functions F( ), S( ) and R( ) executed by the server. The functions F( ) and S( ) compute the two portions of the authentication token for delivery to the client 102.

$$\text{First\_Portion} = F(\text{token}) \quad (1)$$

$$\text{Second\_Portion} = S(\text{token}) \quad (2)$$

The function R( ) is used to reconstruct the original token in response to receiving a request from the client 102 for re-authentication.

$$\text{Recreated\_Token} = R(\text{First\_Portion}, \text{Second\_Portion}) \quad (3)$$

The Recreated_Token matches the original token if and only if First_Portion and Second_Portion were generated according to F( ) and S( ) for the token. According to the general equations above, it will be appreciated by those skilled in the art that there are many ways to split and recombine tokens.

In a specific example of the general functions in equations (1), (2), and (3) above, the two portions of the authentication token are created using a cryptographic secret-splitting scheme. The function F( ) produces the first portion comprising a random string with the same length as the authentication token. The function S( ) computes the second portion comprising the exclusive-or of the authentication token and the first portion. To reconstruct the token, the function R( ) computes the exclusive-or of the first portion and the second portion. In this example, the random string is generated for each token to be split.

In another example of the functions in equations (1), (2), and (3) above, one portion of the authentication token contains an integrity check for the other portion of the authentication token. The function F( ) includes the token (no computation) as the first portion. The function S( ) computes the second portion as a non-invertible function of the authentication token and a secret value known only to the server splitting the authentication token. In this manner, only the server or login service can generate the second portion of the authentication token because any potential attacker does not possess the secret value. The non-invertible function S( ) further prevents an attacker from recovering the secret value even if given access to both portions of the authentication token.

In a further specific example, the server computes the second portion of the authentication token (e.g., the credential value) as a function of the SecCookie (see Table 1 above) and a secret key. SecCookie includes a unique identifier and password for the client 102 encoded in SSL. In addition, SecCookie may identify the resource requested by the client 102. This may be represented by the following formulae.

$$T1 = \text{SecCookie} \quad (4)$$

$$T2 = F(T1, \text{secret key}) \quad (5)$$

The secret key may be any key including, but not limited to, a 128-bit key. The function F( ) in equation (5) above includes, but is not limited to, any encryption algorithm or encoding standard such as an advanced encryption standard (AES) or triple data encryption standard (DES). After computing T1 and T2, the server inserts T2 as the credential value in the hyperlink reference to the additional content in the web content.

Those skilled in the art will note that equations (4) and (5) above are merely exemplary. It is contemplated by the inventors that many other methods of creating the second portion of the authentication token not specifically detailed herein exist and are within the scope of the invention.

Figure 3:
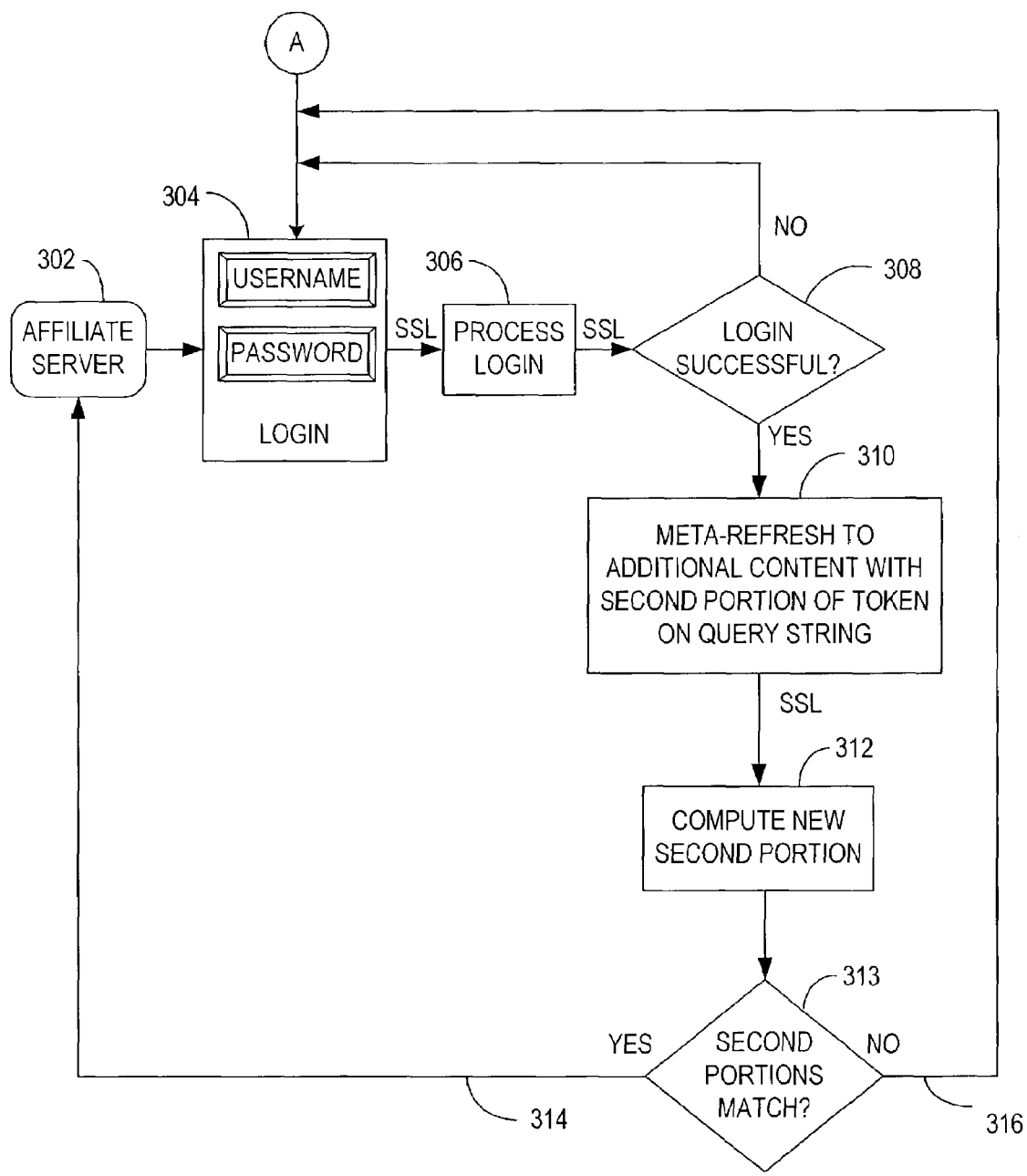
FIG. 3 is a block diagram of an exemplary process flow for initial authentication of the client.

Referring next to FIG. 3, a block diagram illustrates an exemplary process flow for initial authentication of the client 102. The client 102 at 302 submits client identity information such as a login and a password to the server (e.g., an authentication system) at 304 to process the login at 306. In an embodiment as described with reference to FIG. 1, the client 102 submits the credentials to an affiliate server such as affiliate server 106 that communicates with the authentication server. In processing the login, the server creates and delivers to the client 102 the first and second portions of the authentication token as described with reference to FIG. 2. If the login is successful at 308, the client 102 is redirected (e.g., via a meta-refresh) to the additional content referenced in the web content stored by the client 102 at 310. The server receives the second portion of the token stored by the client 102 from the query string in the reference to the additional content. The server computes a new value for the second portion of the token based on the client identifier and the secret key at 312. If the newly computed second portion value matches the second portion value received from the client 102, the server authenticates the client 102 at 314. If the second portion values differ at 313 or if the login was unsuccessful at 308, the client 102 is referred back to the login page with an error message at 316.

Figure 4:
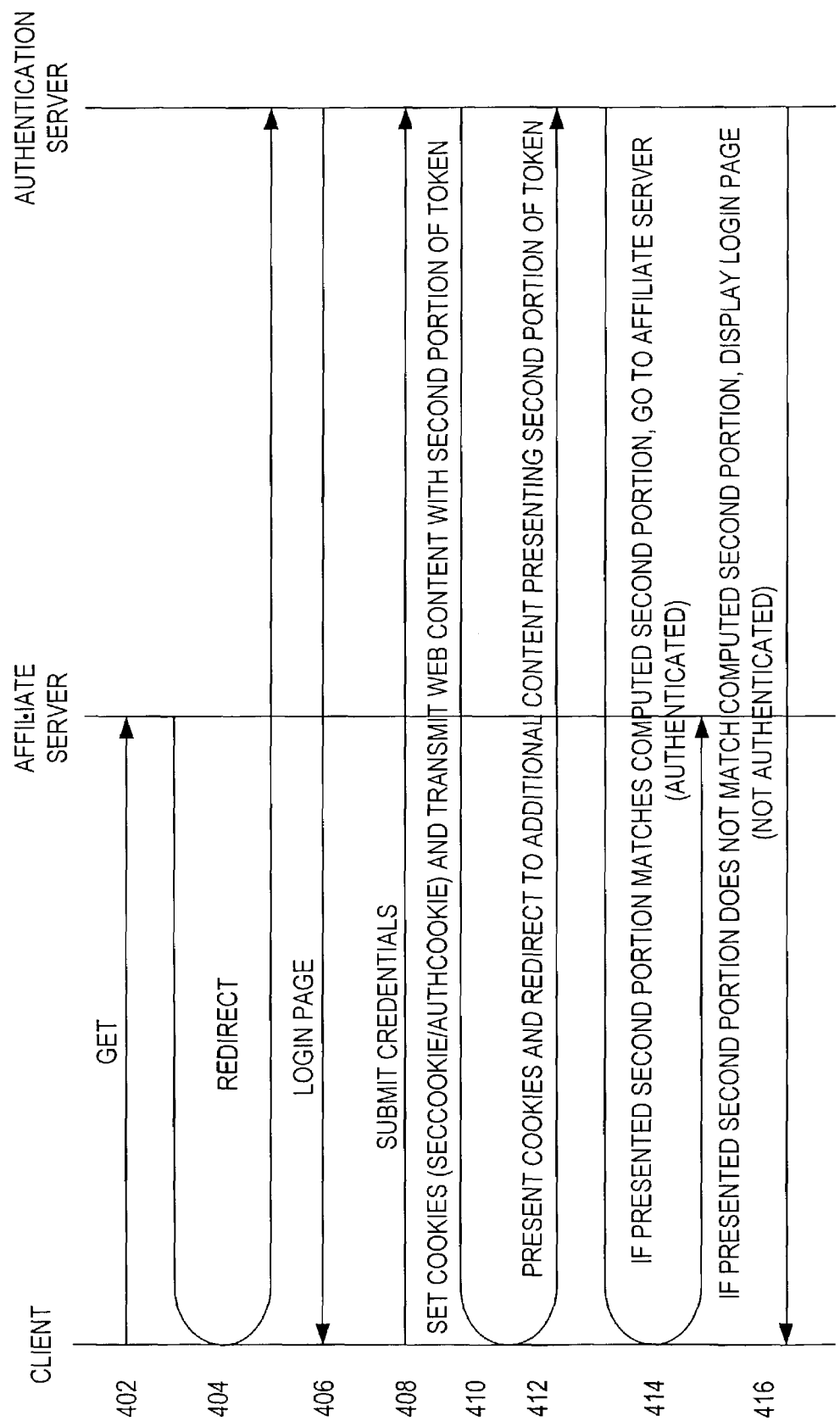
FIG. 4 is a timeline chart of an exemplary process flow for initial authentication of the client.

Referring next to FIG. 4, a timeline chart illustrates an exemplary process flow for initial authentication of the client 102. The client 102 visits a web site provided by an affiliate server and requests web content at 402. The affiliate server redirects the client 102 at 404 to an authentication server or login service that displays a login page at 406, receives credentials from the client 102 at 408, and processes the login information. The authentication server generates the first portion (e.g., the client identifier) and second portion (e.g., the credential value) of the authentication token and modifies the requested web content to include the generated second portion. If the login is successful, the affiliate server sets the expiration date of the web content to now plus thirty days. At 410, the authentication server transmits the requested web content including the second portion to the client 102 and sets cookies for the return URL (to identify the affiliate server), for the first portion of the authentication token, and for the location of the requested web content. The client 102 stores the received web content in the browser cache. The client 102 meta-refreshes or is redirected at 412 to the additional content with the received second portion on the query string and presents the stored cookies to the authentication server. A meta-refresh may be enabled by the authentication server setting a transient cookie. The web content may be a hypertext markup language (HTML) document and the reference in the web content to the additional content may include a hyperlink to a location on the data communication network. The cookies are part of the incoming request headers and are accessible by the additional content, for example, by suitably setting a path or domain attribute on the cookies. The authentication server computes a new second portion value from the received cookies and compares the new second portion value to the second portion value received on the query string from the client 102. If the newly-computed second portion value equals the received second portion value, then the authentication server looks up the return URL in one of the received cookies, deletes the cookie, and performs a HTTP 302 redirect to the return URL at 414 with profile and authentication data in the query string. If the second portion values differ, then the authentication server presents the login page at 416 to the client 102 for another attempt at authentication.

Storing the Credential in the Client Browser Cache

Figure 5:
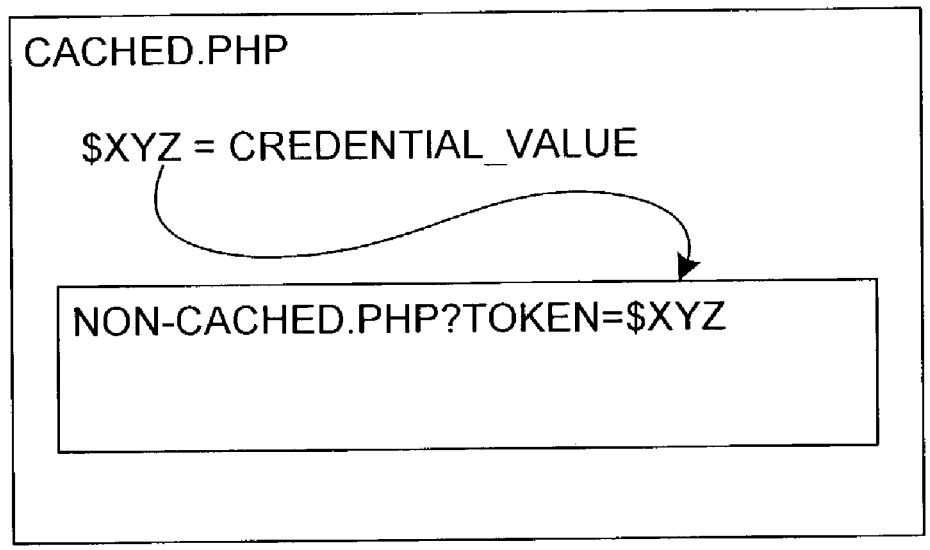
FIG. 5 is an exemplary block diagram illustrating a cached web page referencing a non-cached web page with the second portion of the authentication token as a query string parameter.

Referring next to FIG. 5, an exemplary block diagram illustrates a cached web page referencing a non-cached web page with the credential value as a query string parameter representing the second portion of the authentication token. According to one embodiment of the invention, the authentication token is partially stored in the client browser cache or any other memory area as server-inaccessible information. Those skilled in the art will appreciate that various means for storing and retrieving part of the authentication token from a memory area storing server-inaccessible information exist and are applicable in the invention. The server, executing exemplary software according to the invention, stores a portion of the authentication token (e.g., the second portion) in the client browser cache by sending web content (e.g., an HTML document) including the portion to the client 102 for caching. The web content includes a reference (e.g., a hyperlink) to non-cacheable additional content such as embedded content including, but not limited to, one or more of the following: a frame, an inline frame, an image file, a sound file, a script, an applet, a cascading style sheet, an extensible markup language data island, and text. The server adds the second portion of the authentication token to the reference to the non-cacheable embedded content.

For example, the server may send cached.php as the web content with non-cached.php as the additional content. The server includes credential_value as the query string parameter in the hyperlink "non-cached.php?token=credential_value" to the additional content.

When the client 102 attempts to subsequently render the cached web content, the client browser will render the content from the cache if the content has not changed on the server. In HTTP/1.0, the client 102 queries the server with an "If-Modified-Since" request because the client 102 specifies the date when it last downloaded a copy of the content. By contrast, HTTP/1.1 uses "If-Modified" with opaque identifiers called eTags. In both cases, the client 102 that has some local copy of the content in the cache may query to see if that existing copy may be used. The server decides to serve new content (i.e., indicating that the version in the cache is stale) or returns "Not Modified" implying that the client 102 may use its cached copy. To ensure that the web content is rendered from the cache, the server may assign, for example, a long expiration or recent Last-Modified date to the web content prior to sending the web content during the initial authentication (see FIG. 2). In contrast, the additional, embedded content is marked as non-cacheable. For example, the server may use the "Pragma: No-cache" header in version 1.0 of HTTP protocol or the "Cache-Control: no-cache; no-store" header in version 1.1 of HTTP for the additional content. The outcome of this arrangement is that on subsequent visits, the client 102 obtains the cached copy of the web content but always fetches a new copy of the additional content.

When the client 102 requests the additional content from the cached web page via the hyperlink reference, the credential value in the reference is also sent to the server. Upon receipt of the request from the client 102, the server extracts the credential value from the request and combines the extracted data with the first portion (e.g., via a cookie) according to a predetermined relationship to reconstruct the authentication token. In this manner, as long as the browser caches the web page, the server is able to authenticate the user (e.g., via client 102). The server stores information about the predetermined relationship that creates the credential value, for example, in memory accessible by the server.

Re-Authentication

Figure 6:
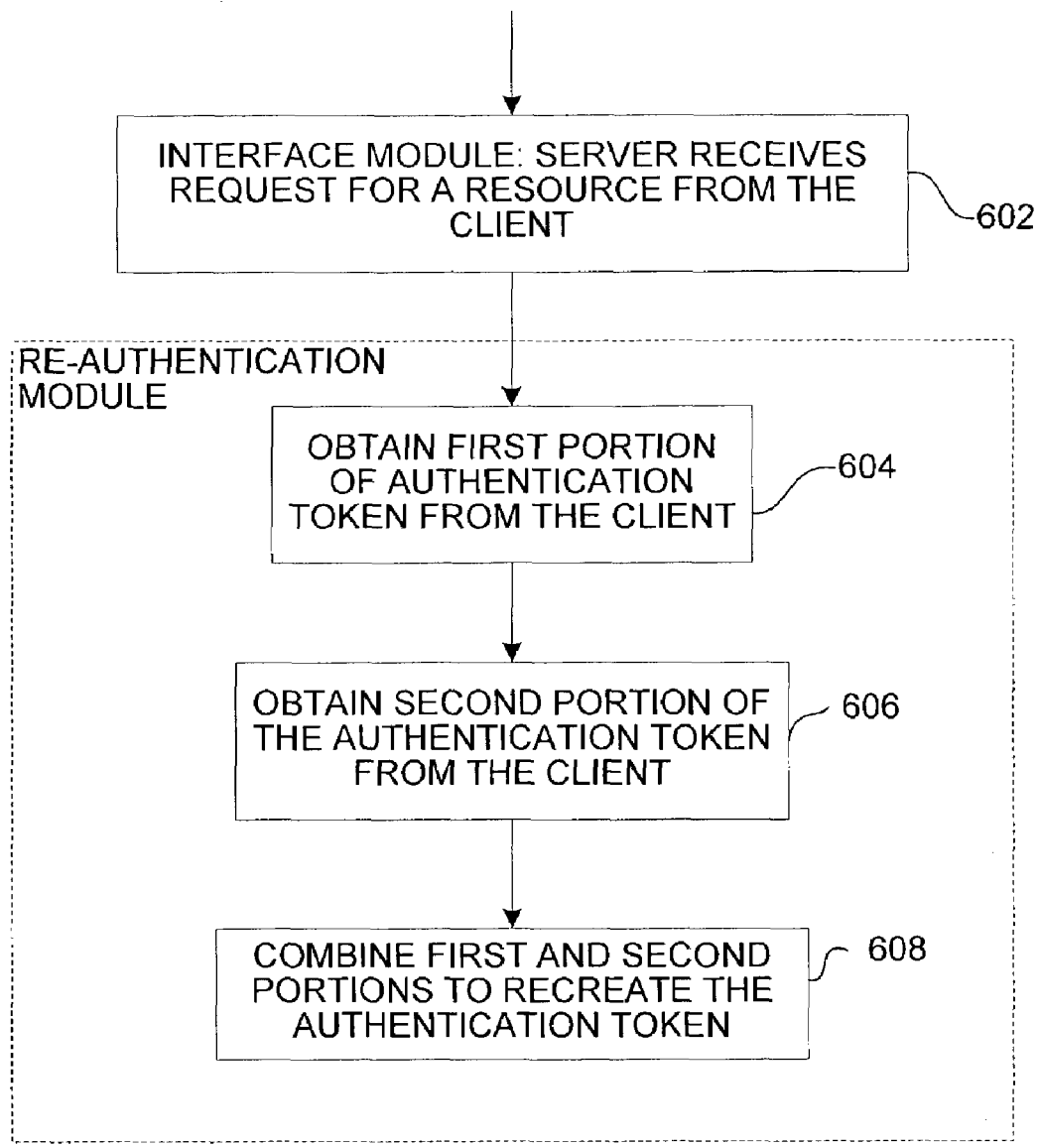
FIG. 6 is an exemplary flow chart illustrating re-authentication of the client by the server.

Referring next to FIG. 6, an exemplary flow chart illustrates re-authentication of the client 102 by the server. One or more computer-readable media of the server have computer-executable instructions, components, or modules for performing the method illustrated in FIG. 6. For example, the computer-readable media may store an interface module such as the interface module of FIG. 2 and a re-authentication module. The interface module receives, at the server, a request from the client 102 for a resource (e.g., a web page) at 602 previously requested by the client 102. The re-authentication module obtains, in response to the request received by the interface module, the first portion of the authentication token from the client 102 at 604. In one embodiment, the first portion includes the client identifier.

In addition, the re-authentication module obtains the second portion of the authentication token (e.g., the credential value) from the client 102 at 606 as follows. The client identifier identifies web content stored by the client 102. The re-authentication module redirects the client 102 to the web content stored by the client 102. The web content stored by the client 102 includes a reference to additional content hosted by or otherwise accessible to the server. The reference includes the credential value representing a function of the first portion of the authentication token stored by the client 102 in the first memory area 107 and a key value. The server receives a request from the client 102 for the additional content. As the request includes the reference with the credential value, the server also receives the credential value. The server delivers the additional content to the client 102 in response to the request.

The re-authentication module combines the obtained first portion (e.g., the client identifier) and the obtained second portion (e.g., the credential value) to recreate the authentication token at 608. In one embodiment, the server computes another credential value as a function of the client identifier and the key value. If the computed credential value matches the received credential value, the server recreates the authentication token and authenticates the client 102. For example, the server may provide the recreated authentication token to the client 102 or provide other authentication data to the client 102. If the computed credential value differs from the received credential value, the server delivers an error message to the client 102.

Figure 7:
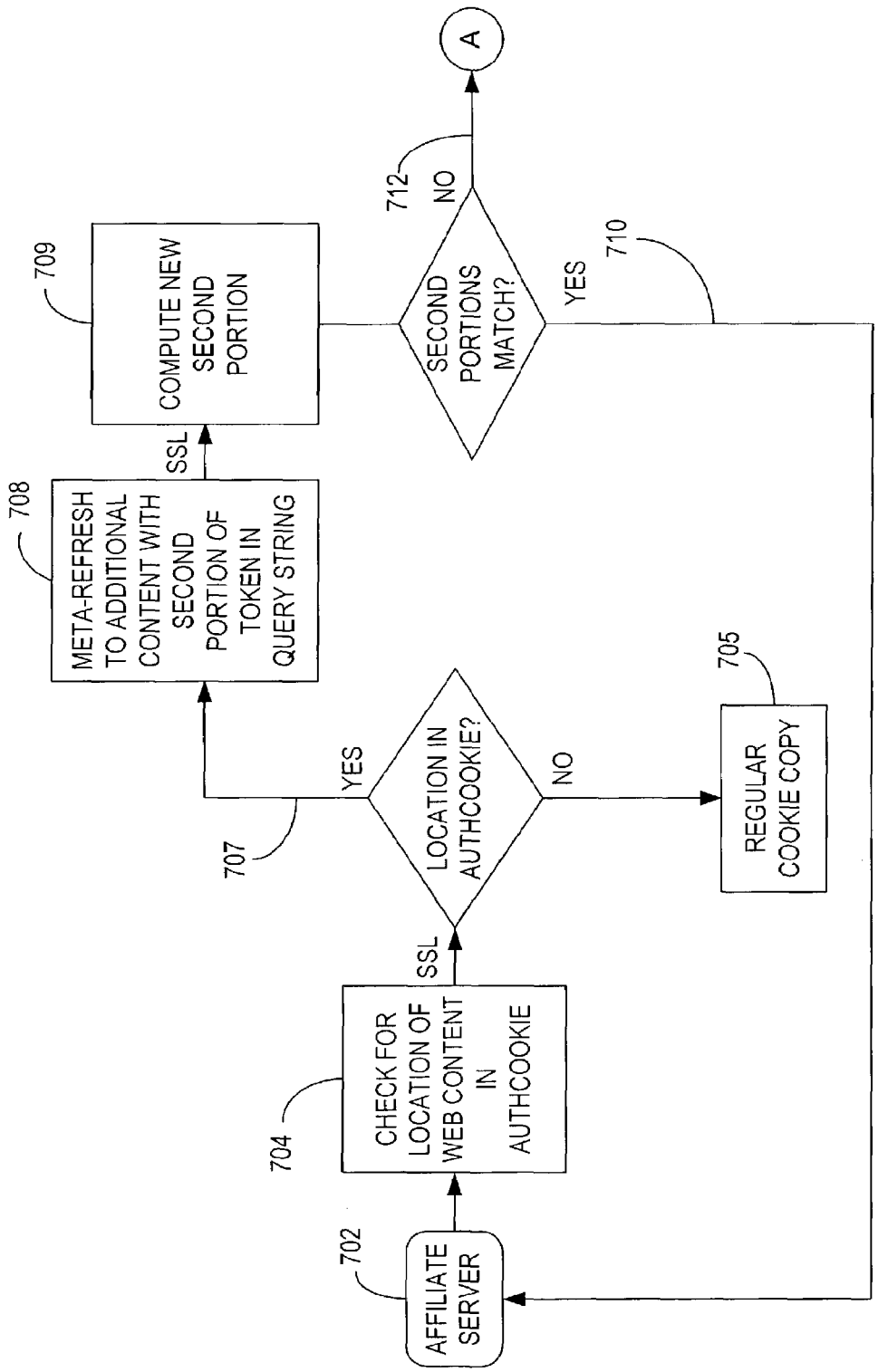
FIG. 7 is a block diagram of an exemplary process flow for re-authentication of the client.
Figure 8:
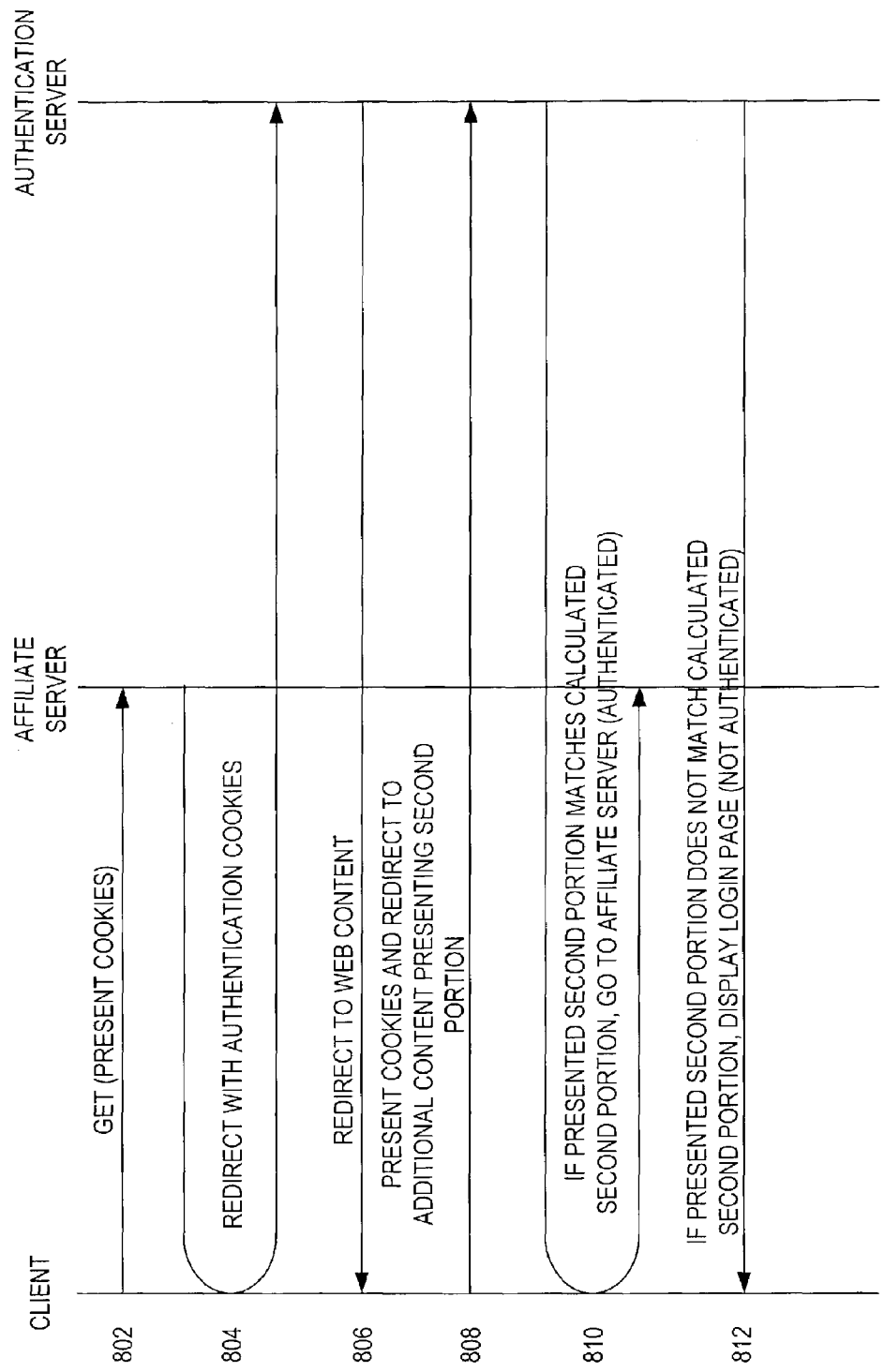
FIG. 8 is a timeline chart of an exemplary process flow for re-authentication of the client.

Referring next to FIG. 7 and FIG. 8, a block diagram and a timeline chart illustrate an exemplary process flow for re-authentication of the client 102. The client 102 visits a previously visited web site provided by an affiliate server at 702, 802. In the multi-site user authentication system embodiment, the client 102 is redirected at 804 to the authentication system that performs operations described herein that are performed by the affiliate server in other embodiments. During initial authentication of the client 102, the authentication server generates a network address for the web content. The authentication server provides the generated network address to the client 102 for storage as part of the first portion of the authentication token. The authentication server checks for the location (e.g., URL) of the web content in AuthCookie at 704. If the location of the web content is not in AuthCookie, then a regular cookie copy occurs at 705. If the location of the web content is in AuthCookie, then the authentication server sets cookies with the return URL data, authentication data, and profile data at 707. In addition, the client 102 is redirected at 806 to the web content per the location in AuthCookie. The client browser renders the web content from the browser cache. In rendering the cached web content, the client 102 meta-refreshes over SSL at 708, 808 to the additional content referenced in the web content with the stored second portion value in the query string. The authentication server computes a new second portion value from SecCookie and compares the newly computed second portion value with the second portion value received from the client 102 in the query string at 709. If the newly computed second portion equals or otherwise matches the received second portion value, then the authentication server looks up the return URL in a cookie, deletes the cookie, and performs a HTTP 302 redirect to the return URL of the affiliate server with profile and authentication data in the query string at 710, 810. If the second portion values differ, then the authentication server presents the login page to the client 102 to force an initial authentication at 712, 812 (see reference character 304 in FIG. 3).

Exemplary Operating Environment

Figure 9:
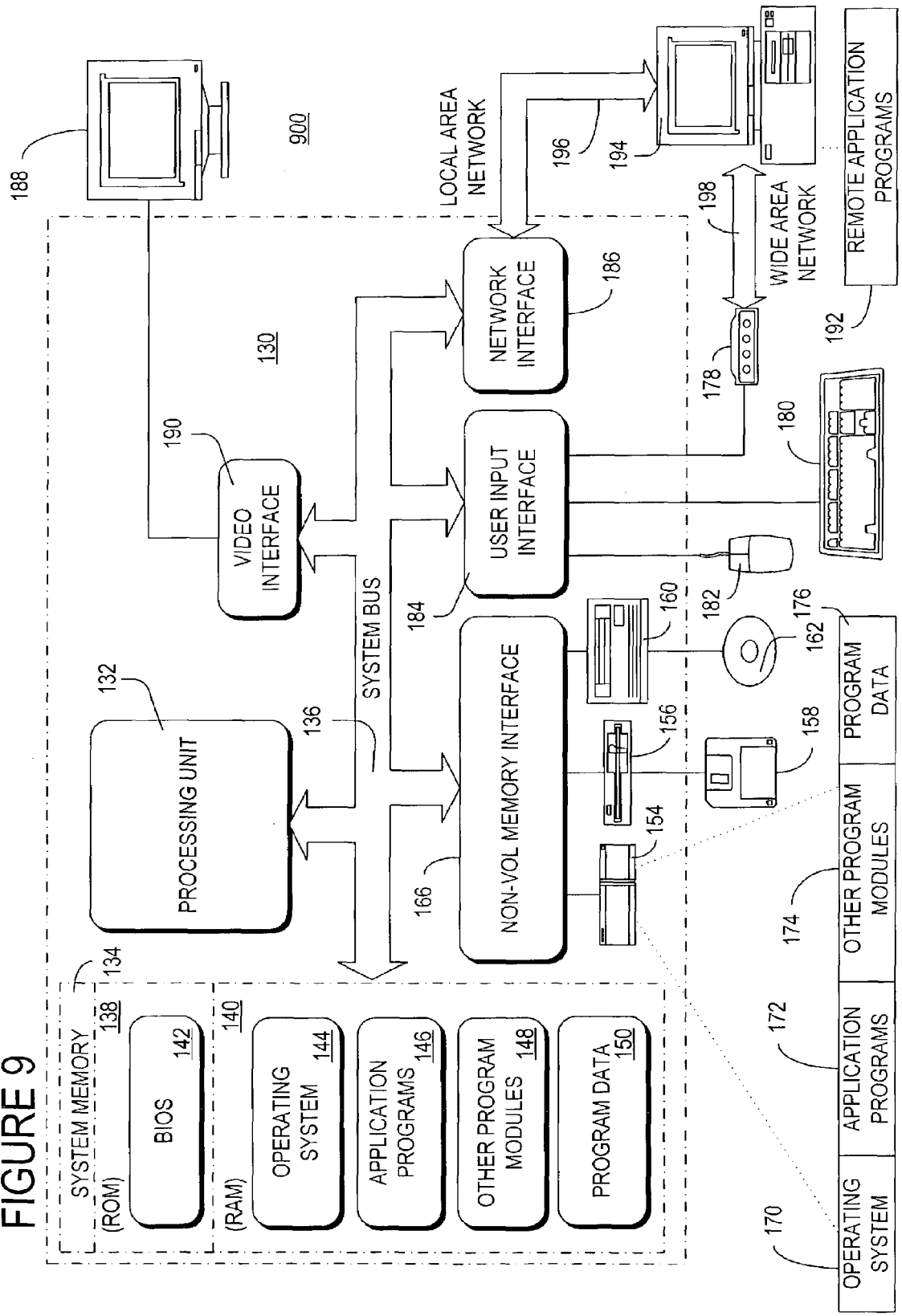
FIG. 9 is a block diagram illustrating one example of a suitable computing system environment in which the invention may be implemented.

FIG. 9 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 9 illustrates operating system 144, application programs 146, other program modules 148, and program data 150.

The computer 130 may also include other removable/non-removable, volatile/nonvolatile computer storage media. For example, FIG. 9 illustrates a hard disk drive 154 that reads from or writes to non-removable, nonvolatile magnetic media. FIG. 9 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 9, provide storage of computer readable instructions, data structures, program modules and other data for the computer 130. In FIG. 9, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 9 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 9 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 of the server executes computer-executable instructions such as those illustrated in FIG. 2 to provide the first and second portions of the authentication token to the client 102. In addition, computer 130 of the server executes computer-executable instructions such as those illustrated in FIG. 6 to receive the first and second portions of the authentication token from the client 102 and combine the received portions to authenticate the user (e.g., via client 102).

Information in this document, including network addresses such as uniform resource locators and Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of improving the security of protocols for communication between a client and a server coupled to a data communication network, the method comprising:
   receiving, at the server, a request from the client for a resource;
   computing a first portion of data from the authentication token;
   providing the computed first portion to the client in response to the received request for the resource, said computed first portion being adapted for storage in a first memory area associated with the client, said first memory area comprising a cookie;
   computing a second portion of data from the authentication token; and
   providing the computed second portion to the client in response to the received request for the resource, said computed second portion being adapted for storage as information in a second memory area associated with the client, said information being inaccessible to the server.

2. The method of claim 1, wherein the first memory area comprises a memory area accessible to the server.

3. The method of claim 1, wherein the second memory area comprises a browser cache accessible to the client and inaccessible to the server.

4. The method of claim 1, wherein the computed first portion comprises a client identifier.

5. The method of claim 4, further comprising:
   receiving, at the server, client identity information from the client;
   generating the client identifier in response to the received client identity information, the generated client identifier containing at least a part of the received client identity information; and
   delivering the generated client identifier to the client for storage in the first memory area.

6. The method of claim 5, wherein the client identity information comprises a login name and a password of the client.

7. The method of claim 5, wherein the computed second portion comprises a credential value computed as a function of at least a part of the received client identity information and a key value.

8. The method of claim 7, wherein the resource comprises web content, and further comprising:
   computing the credential value as a function of at least a part of the received client identity information and the key value;
   adding the computed credential value to the web content; and
   delivering the web content with the computed credential value to the client for storage in the second memory area.

9. The method of claim 8, wherein the delivered web content includes a reference to additional content accessible to the server, the reference including the credential value delivered to the client for storage in the second memory area, and further comprising:
   redirecting the client to the additional content via the reference;
   receiving, from the client in response to said redirecting, the client identifier and the credential value;
   computing another credential value as a function of the received client identifier and the key value; and
   authenticating the client if the computed, other credential value matches the received credential value.

10. The method of claim 9, further comprising delivering an error message to the client if the received credential value differs from the computed, other credential value.

11. The method of claim 9, wherein the reference to additional content comprises a hyperlink to a location on the data communication network.

12. The method of claim 8, wherein the web content includes a hypertext markup language (HTML) document, wherein the web content includes a reference to additional content accessible to the server, wherein the reference comprises a hyperlink to a location on the data communication network, and wherein the additional content is accessible by the client from within the HTML document via the hyperlink.

13. The method of claim 1, further comprising:
   generating a network address for the web content; and
   providing the generated network address to the client for storage as part of the computed first portion.

14. The method of claim 1, further comprising:
   receiving, at the server, another request from the client for the resource;
   obtaining, in response to the received, other request, the computed first portion from the client;
   obtaining, in response to the received, other request, the computed second portion from the client; and
   combining the obtained first and second portions to recreate the authentication token.

15. The method of claim 1, wherein the server and the client communicate via a stateless protocol having request-response semantics.

16. The method of claim 1, wherein the computed first portion comprises a randomly-generated string having a first string length equal to a second string length associated with the authentication token, and wherein the computed second portion comprises an exclusive-or computation of the computed first portion and the authentication token.

17. The method of claim 1, wherein one or more computer readable media have computer-executable instructions for performing the method recited in claim 1.

18. A method of improving the security of protocols for communication between a client and a server coupled to a data communication network, the method comprising:

receiving, at the server, a request from the client for a resource;

obtaining, in response to the received request for the resource, a first portion of data associated with an authentication token from the client, said first portion being stored by the client in a first memory area, said first memory area comprising a cookie, wherein a second portion of data is stored by the client as information in a second memory area, said information being inaccessible to the server;

obtaining, in response to the received request for the resource, the second portion associated with the authentication token from the client; and combining the obtained first and second portions to recreate the authentication token.

19. The method of claim 18, wherein obtaining the first portion comprises receiving, from the client, a client identifier specific to the client.

20. The method of claim 18, wherein obtaining the first portion comprises receiving, from the client, the cookie containing a client identifier specific to the client.

21. The method of claim 18, wherein obtaining the second portion comprises receiving, from the client, a credential value computed as a function of the first portion stored by the client in the first memory area and a key value.

22. The method of claim 18, wherein the resource comprises web content, and wherein obtaining the first portion comprises:

receiving, from the client, a client identifier specific to the client, the client identifier identifying the web content stored by the client; and redirecting the client to the web content stored by the client.

23. The method of claim 22, wherein the client identifier comprises one or more of the following: a login name, a password, a key value, and a uniform resource locator.

24. The method of claim 22, wherein the web content stored by the client includes a reference to additional content accessible to the server, the reference including a credential value representing a function of the first portion stored by the client in the first memory area and a key value, wherein obtaining the second portion comprises:

receiving, at the server, another request from the client for the additional content, the other request comprising the reference;

receiving the credential value stored by the client in the first memory area via the received reference; and delivering the additional content to the client in response to the other request.

25. The method of claim 24, wherein combining comprises:

computing another credential value as a function of the obtained first portion and the key value; and recreating the authentication token if the computed credential value matches the received credential value.

26. The method of claim 25, further comprising providing the recreated authentication token to the client to authenticate the client.

27. The method of claim 25, further comprising delivering an error message to the client if the computed credential value differs from the received credential value.

28. The method of claim 18, wherein the first portion comprises a randomly-generated string having a first string length equal to a second string length associated with the authentication token, wherein the second portion comprises an exclusive-or computation of the first portion and the authentication token, and wherein combining comprises computing the exclusive-or of the first portion and the second portion.

29. The method of claim 18, wherein one or more computer readable media have computer-executable instructions for performing the method recited in claim 18.

30. One or more computer-readable media having computer-executable components for improving the security of protocols for communication between a client and a server coupled to a data communication network, the components comprising:

an interface module for receiving, at the server, a request from the client for a resource; and an authentication module for providing a first portion of data associated with the authentication token to the client in response to the request for the resource received by the interface module, said first portion being adapted for storage in a first memory area associated with the client, said first memory area comprising a cookie, said authentication module further providing a second portion of data associated with the authentication token to the client in response to the request for the resource received by the interface module, said second portion being adapted for storage as information in a second memory area associated with the client, said information being inaccessible to the server.

31. The computer-readable media of claim 30, wherein the first portion comprises a client identifier, wherein the interface module further receives, at the server, client identity information from the client, wherein the authentication module further generates the client identifier in response to the received client identity information, the generated client identifier containing at least a part of the received client identity information, and wherein the interface module further delivers the generated client identifier to the client for storage in the first memory area.

32. The computer-readable media of claim 31, wherein the second portion comprises a credential value computed as a function of at least a part of the received client identity information and a key value, wherein the authentication module further computes the credential value as a function of at least a part of the received client identity information and the key value, wherein the resource comprises web content, wherein the authentication module further adds the computed credential value to the web content, and wherein the authentication module further delivers the web content with the computed credential value to the client for storage in the second memory area.

33. The computer-readable media of claim 32, wherein the delivered web content includes a reference to additional content accessible to the server, the reference including the credential value delivered to the client for storage in the second memory area, wherein the interface module further redirects the client to the additional content via the reference and receives the client identifier and the credential value from the client in response to said redirecting, wherein the authentication module further computes another credential value as a function of the received client identifier and the key value and authenticates the client if the computed, other credential value matches the received credential value.

34. The computer-readable media of claim 30, wherein the interface module further receives, at the server, another request from the client for the resource, and further comprising a re-authentication module for:

obtaining, in response to the other request for the resource received by the interface module, the first portion from the client;

obtaining, in response to the other request for the resource received by the interface module, the second portion from the client; and combining the obtained first and second portions to recreate the authentication token.

35. The computer-readable media of claim 34, wherein obtaining the first portion comprises:

receiving, from the client, a client identifier specific to the client, the client identifier identifying web content stored by the client; and redirecting the client to the web content stored by the client.

36. The computer-readable media of claim 35, wherein the web content stored by the client includes a reference to additional content accessible to the server, the reference including a credential value representing a function of the first portion stored by the client in the first memory area and a key value, wherein obtaining the second portion comprises:

receiving, at the server, another request from the client for the additional content, the other request comprising the reference;

receiving the credential value stored by the client in the first memory area via the received reference; and delivering the additional content to the client in response to the other request.

37. The computer-readable media of claim 36, wherein combining comprises:

computing another credential value as a function of the obtained first portion and the key value; and recreating the authentication token if the computed credential value matches the received credential value.

* * * * *